United States Patent
Shah et al.

(10) Patent No.: US 7,372,536 B2
(45) Date of Patent: May 13, 2008

(54) PHOTOSTORY 3—AUTOMATED MOTION GENERATION

(75) Inventors: Mehul Y. Shah, Redmond, WA (US); Dongmei Zhang, Bellevue, WA (US); Vladimir Rovinsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 11/074,414

(22) Filed: Mar. 8, 2005

(65) Prior Publication Data

US 2006/0203199 A1    Sep. 14, 2006

(51) Int. Cl.
- G03B 21/32   (2006.01)
- G09G 5/00    (2006.01)
- G06T 13/00   (2006.01)
- G06K 9/36    (2006.01)

(52) U.S. Cl. .................. 352/87; 345/473; 345/619; 382/236

(58) Field of Classification Search ............ 352/87, 352/244; 345/619, 473, 474; 382/236
See application file for complete search history.

(56) References Cited

U.S. PATENT DOCUMENTS

| | | |
|---|---|---|
| 4,864,516 A | 9/1989 | Gaither et al. |
| 4,974,178 A | 11/1990 | Izeki et al. |
| 5,760,788 A | 6/1998 | Chainini et al. |
| 5,973,755 A | 10/1999 | Gabriel |
| 6,040,861 A | 3/2000 | Boroczky et al. |
| 6,072,480 A | 6/2000 | Gorbet et al. |
| 6,084,590 A | 7/2000 | Robotham et al. |
| 6,097,757 A | 8/2000 | Boice et al. |
| 6,108,001 A | 8/2000 | Tuttle |
| 6,121,963 A | 9/2000 | Ange |
| 6,222,883 B1 | 4/2001 | Murdock et al. |
| 6,333,753 B1 | 12/2001 | Hinckley |
| 6,369,835 B1 | 4/2002 | Lin |
| 6,469,711 B2 | 10/2002 | Foreman et al. |
| 6,480,191 B1 | 11/2002 | Balabanovic |
| 6,546,405 B2 | 4/2003 | Gupta et al. |
| 6,597,375 B1 | 7/2003 | Yawitz |
| 6,624,826 B1 | 9/2003 | Balabanovic |

(Continued)

FOREIGN PATENT DOCUMENTS

EP    1126721    4/2004

(Continued)

OTHER PUBLICATIONS

Apple iMovie, http://www.apple.com/ilife/imovie/, last viewed May 25, 2005.

(Continued)

*Primary Examiner*—Rodney Fuller
(74) *Attorney, Agent, or Firm*—Amin, Turocy & Calvin, LLP

(57) ABSTRACT

A system and/or a method facilitates creating an image-based video by automatically applying a motion to an image. A motion component can receive the image and generate a corresponding motion, which can mitigate complications involved with authoring the image-based video. The motion component can apply the motion to the image based at least upon a comparison between an aspect ratio of the image and a resulting video aspect ratio. The comparison can be a numeric difference, wherein the difference can be associated with a category, wherein the category provides the motion to be applied.

15 Claims, 11 Drawing Sheets

U.S. PATENT DOCUMENTS

| | | |
|---|---|---|
| 6,628,303 B1 | 9/2003 | Foreman et al. |
| 6,654,029 B1 | 11/2003 | Chiu et al. |
| 6,665,835 B1 | 12/2003 | Gutfreund et al. |
| 6,686,970 B1 | 2/2004 | Windle |
| 6,708,217 B1 | 3/2004 | Colson et al. |
| 6,763,175 B1 | 7/2004 | Trottier et al. |
| 6,803,925 B2 | 10/2004 | Vronay |
| 6,823,013 B1 | 11/2004 | Boice et al. |
| 7,073,127 B2 | 7/2006 | Zhao et al. |
| 7,240,297 B1 | 7/2007 | Anderson et al. |
| 2001/0040592 A1 | 11/2001 | Foreman et al. |
| 2002/0065635 A1 | 5/2002 | Lei et al. |
| 2002/0109712 A1 | 8/2002 | Yacovone et al. |
| 2002/0156702 A1 | 10/2002 | Kane |
| 2003/0085913 A1 | 5/2003 | Ahmad et al. |
| 2004/0017390 A1 | 1/2004 | Knowlton et al. |
| 2004/0017508 A1 | 1/2004 | Huang |
| 2004/0056882 A1 | 3/2004 | Foreman et al. |
| 2004/0066395 A1 | 4/2004 | Foreman et al. |
| 2004/0071441 A1 | 4/2004 | Foreman et al. |
| 2004/0095379 A1 | 5/2004 | Chang et al. |
| 2004/0130566 A1 | 7/2004 | Bannerjee et al. |
| 2004/0199866 A1 | 10/2004 | Deshpande |
| 2005/0025568 A1 | 2/2005 | Mettler |
| 2005/0034077 A1* | 2/2005 | Jaeger .................. 715/732 |
| 2005/0042591 A1 | 2/2005 | Bloom et al. |
| 2005/0132284 A1 | 6/2005 | Lloyd et al. |
| 2005/0138559 A1 | 6/2005 | Santos-Gomez et al. |
| 2006/0041632 A1 | 2/2006 | Shah et al. |
| 2006/0072017 A1 | 4/2006 | Zhang et al. |
| 2006/0188173 A1 | 8/2006 | Rovinsky et al. |
| 2006/0203199 A1 | 9/2006 | Shah et al. |
| 2006/0204214 A1 | 9/2006 | Shah et al. |
| 2006/0224778 A1 | 10/2006 | Shah et al. |

FOREIGN PATENT DOCUMENTS

| | | |
|---|---|---|
| EP | 1443420 | 8/2004 |
| GB | 2388241 | 4/2002 |
| WO | WO2004062260 | 7/2004 |

OTHER PUBLICATIONS

ImageMatics StillMotion, http://www.imagematics.com/Product/benefits, last viewed May 25, 2005.

ProShow, http://www.photodex.com/products/proshow/, last viewed May 25, 2005.

Moving Picture, http://www.stagetools.com/, last viewed May 25, 2005.

Still Life, http://www.grantedsw.com/still_/, last viewed May 25, 2005.

DigiRostrum, http://www.limidium.com/digirostrum.htm, last viewed May 25, 2005.

Pan & Zoom, http://www.applied-magic.com/pdf/panandzoom.pdf, last viewed May 25, 2005.

Dissolve Factory, http://www.buena.com/dissolvefactory.shtml, last viewed May 25, 2005.

Photo Jam, http://www.shockwave.com/sw/content/photojam, last viewed May 25, 2005.

ACDSee, http://www.acdsystems.com/nr/acdsee7/en/homelife/index.html, last viewed May 25, 2005.

Photo Show, http://www.simplestar.com/, last viewed May 25, 2005.

ACD VideoMagic, http://www.acdsystems.com/English/Products/ACDVideoMagic/index.htm, as viewed on Jun. 15, 2005.

Wizard 97, http://msdn.microsoft.com/library/en-us/wizrd/sdkwizv4_awn.asp?frame=true, last viewed on Jun. 14, 2005.

Inductive User Interface Guidelines, http://msdn.microsoft.com/library/en-us/dnwui/html/iuiguidelines.asp?frame=true, as viewed on Jun. 14, 2005.

Getting Started with Apple Applications, http://developer.apple.com/referencelibrary/GettingStarted/GS_AppleApplications/, as viewed on Jun. 15, 2005.

Mozilla Foundation Announces More Open, Scriptable Plugins, http://www.mozilla.org/press/mozilla-2004-06-30.html, as viewed on Jun. 15, 2005.

Matrox releases WYSIWYG output Plug-in for Combustion, http://www.digitalproducer.com/articles/viewarticle.jsp?id=27959, as viewed on Jun. 15, 2005.

Minos N. Garofalakis, et al., Resource Scheduling for Composite Multimedia Objects, Proceedings of the 24th VLDB Conference, 1998, 12 pages, New York, USA.

Gultekin Ozsoyoglu, et al., Automating the Assembly of Presentations from Multimedia Databases, Case Western Reserve University, 1996, 20 pages, Cleveland, USA.

A. Schodl et al. Video Textures. Proceedings of the 27th Annual Conference on Computer Graphics and Interactive Techniques, pp. 489-498, 2000.

C. Chiang, et al. A New Image Morphing Technique for Smooth Visa Transitions in Panoramic Image-based Virtual Environment. Proceedings of the ACM Symposium on Virtual Reality Software and Technology, pp. 81-90, 1998.

S. Counts and E. Fellheimer. Supporting a Social Presence Through Lightweight Photo Sharing On and Off the Desktop. Proceedings of the 2004 Conference on Human Factors in Computing Systems, pp. 599-606, 2004.

MobileBlogs. 3 pages. Last Viewed on Sep. 9, 2004. http://www.mobileblogs.info.

Blogger. 1 page. Last Viewed on Sep. 9, 2004. http://www.blogger.com.

PhotoStory. 3 pages. Last Viewed on Sep. 9, 2004. http://www.microsoft.com/PhotoStory.

Nokia LifeBlog. 1 page. Last Viewed on Sep. 9, 2004. http://www.nokia.com/nokia/0,,55360,00.html.

Blogging goes Mobile. BBC News. 2 pages. Last Updated Feb. 23, 2003. news.bbc.co.uk/1/hi/technology/2783951.stm.

Jacob Rosenberg, Adobe Premiere Pro 1.5 Studio Techniques, Jun. 28, 2004, Adobe Press, Chapter 1, App. E, App. G.

U.S. Appl. No. 10/924,382, filed Aug. 23, 2004, Shah et al.
U.S. Appl. No. 10/959,385, filed Oct. 6, 2004, Zhang et al.
U.S. Appl. No. 11/064,298, filed Feb. 23, 2005, Rovinsky et al.
U.S. Appl. No. 11/091,864, filed Mar. 28, 2005, Shah et al.
U.S. Appl. No. 11/098,631, filed Apr. 4, 2005, Shah et al.
U.S. Appl. No. 11/079,151, filed Mar. 14, 2005, Shah et al.

* cited by examiner

PHOTOSTORY 3—AUTOMATED MOTION GENERATION

CROSS-REFERENCE TO RELATED APPLICATION(S)

This application is related to U.S. Pat. No. 6,803,925 filed on Sep. 6, 2001 and entitled "ASSEMBLING VERBAL NARRATION FOR DIGITAL DISPLAY IMAGES," and co-pending U.S. patent application Ser. No. 10/924,382 filed on Aug. 23, 2004 and entitled "PHOTOSTORY FOR SMART PHONES AND BLOGGING (CREATING AND SHARING PHOTO SLIDE SHOWS USING CELLULAR PHONES)." This application is also related to co-pending U.S. patent application Ser. No. 10/959,385 filed on Oct. 6, 2004 and entitled "CREATION OF IMAGE BASED VIDEO USING STEP-IMAGES," co-pending U.S. patent application Ser. Nos. 11/079,151, 11/091,864, and 11/098, 631, titled "PICTURE LINE AUDIO AUGMENTATION," "PLUG-IN ARCHITECTURE FOR POST-AUTHORING ACTIVITIES" "SYSTEMS AND METHODS TO ADJUST A SOURCE IMAGE ASPECT RATIO TO MATCH A DIFFERENT TARGET DISPLAY ASPECT RATIO," and "LINKED WIZARDS," filed on Mar. 14, 2005, Mar. 28, 2005, Feb. 23, 2005, and Apr. 4, 2005, respectively.

TECHNICAL FIELD

The present invention generally relates to computer systems, and more particularly to a system and/or a method relating to image-based video that facilitates applying a motion to an image.

BACKGROUND OF THE INVENTION

There is an increasing use of digital photography based upon decreased size and cost of digital cameras and increased availability, usability, and resolution. Manufacturers and the like continuously strive to provide smaller electronics to satisfy consumer demands associated with carrying, storing, and using such electronic devices. Based upon the above, digital photography has demonstrated growth and has proven to be a profitable market for both electronics and software.

A user first experiences the overwhelming benefits of digital photography upon capturing a digital image. While conventional print photography forces the photographer to wait until development of expensive film to view a print, a digital image in digital photography can be viewed within sub-seconds by utilizing a thumbnail image and/or viewing port on a digital camera. Additionally, images can be deleted or saved based upon user preference, thereby allowing efficient use of limited image storage space. In general, digital photography provides a more efficient experience in photography.

Editing techniques available for a digital image are vast and numerous with limitations being only the editor's imagination. For example, a digital image can be edited using techniques such as crop, resize, blur, sharpen, contrast, brightness, gamma, transparency, rotate, emboss, red-eye, texture, draw tools (e.g., a fill, a pen, add a circle, add a box), an insertion of a text, etc. In contrast, conventional print photography merely enables the developer to control developing variables such as exposure time, light strength, type of light-sensitive paper, and various light filters. Moreover, such conventional print photography techniques are expensive whereas digital photography software is becoming more common on computers.

Digital photography also facilitates sharing of images. Once stored, images that are shared with another can accompany a story (e.g., a verbal narration) and/or physical presentation of such images. Regarding conventional print photographs, sharing options are limited to picture albums, which entail a variety of complications involving organization, storage, and accessibility. Moreover, physical presence of the album is a typical manner in which to share print photographs with another.

In view of the above benefits associated with digital photography and deficiencies of traditional print photography, digital images and albums have increasingly replaced conventional print photographs and albums. In particular, image-based video provides a convenient and efficient technique for sharing digital images. Image-based video generally is a slide show of images simulating/emulating motion (e.g., panning, zooming, transitioning, . . . ) through still images. An effect of utilizing image-based video is an enhanced motion video experience that enables details of high-resolution images to be better viewed on a TV screen and/or computer monitor. For example, resolution of a picture taken by a typical 3 Mega Pixel digital still camera is about 2000×1500 pixels whereas resolution of a typical computer monitor is 1024×768 pixels. With the image-based video technique, it is convenient for portions of a 2000×1500 pixel image (e.g., 1024×768 pixels) to be better viewed on a monitor of resolution 1024×768 pixels. This effect is becoming more and more important with the resolution of digital images produced by digital still cameras getting higher and higher. Furthermore, using panning and zooming effects in image-based video, details of such high-resolution pictures can be better viewed on lower resolution display devices such as monitors and/or TV screens.

With the vast sudden exposure to digital photography and digital cameras, the majority of digital camera users are unfamiliar with the plethora of applications, software, techniques, and systems dedicated to generating image-based video presentations. Furthermore, a user typically views and/or prints with little or no delay. Thus, in general, camera users prefer quick and easy image presentation capabilities with high quality and/or aesthetically pleasing features. Traditional image presentation applications and/or software require vast computer knowledge and experience in digital photography editing, (based upon the overwhelming consumer consumption) it is difficult for most users to comprehend and/or to dedicate the necessary time to self-educate themselves in this particular realm.

In view of the above, there is a need to improve upon and/or provide systems and/or methods relating to image-based video creation that facilitate applying motion and transitions to an image to create an aesthetically pleasing viewing experience with minimal user interaction.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate creating an image-based video by automatically generating and/or applying a motion to an image. A motion component can receive the image and generate a corresponding motion to the image to mitigate complications involved with instantiating the image-based video. The motion component can apply motion such as, a pan, a zoom, a zoom and a pan, to one or more images regardless of size, format, a file size, and an aspect ratio. It is to be appreciated that the motion applied is based at least in part upon image characteristics (e.g., an aspect ratio of the image and its relation to the aspect ratio of the resulting video). In particular, the motion component can apply motion based upon an image characteristic and/or a resulting video aspect ratio and/or motion applied to the adjacent images, wherein the resulting video is a projected display of the image-base video.

In accordance with an aspect of the subject invention, the motion component can include an analyzer component that analyzes the image. The analyzer can determine the required analysis in relation to the aspect ratios of the image and the resulting video. Furthermore, the analyzer component can create a reference rectangle that is a virtual rectangle with the substantially similar aspect ratio as the resulting video. The image can be positioned in the center of the reference rectangle to facilitate creating the image-based video. In accordance with another aspect of the subject invention, the motion component can include a motion generator that automatically generates the motion for the image based at least in part upon the analysis from the analyzer component. The motion can be based upon a comparison and/or a numeric difference between the aspect ratio of the image and the aspect ratio of the resulting video.

Furthermore, the motion component can utilize a duration component that determines a duration for which the image is displayed in the image-based video. The duration component can utilize functions to calculate a zoom motion duration, a pan motion duration, a zoom and pan motion duration, a zooming motion distance, a panning motion distance and a zoom and pan motion distance. In accordance with still another aspect of the subject invention, an adjacent component can determine the motion for a second image based upon a first image, wherein the first image and the second image are adjacent and are displayed sequentially one after another. The adjacent component can facilitate applying motion to the second image based upon the motion for the first image. Additionally, the motion component can implement a transition component to apply a transition for a duration between two subsequent images within the image-based video.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
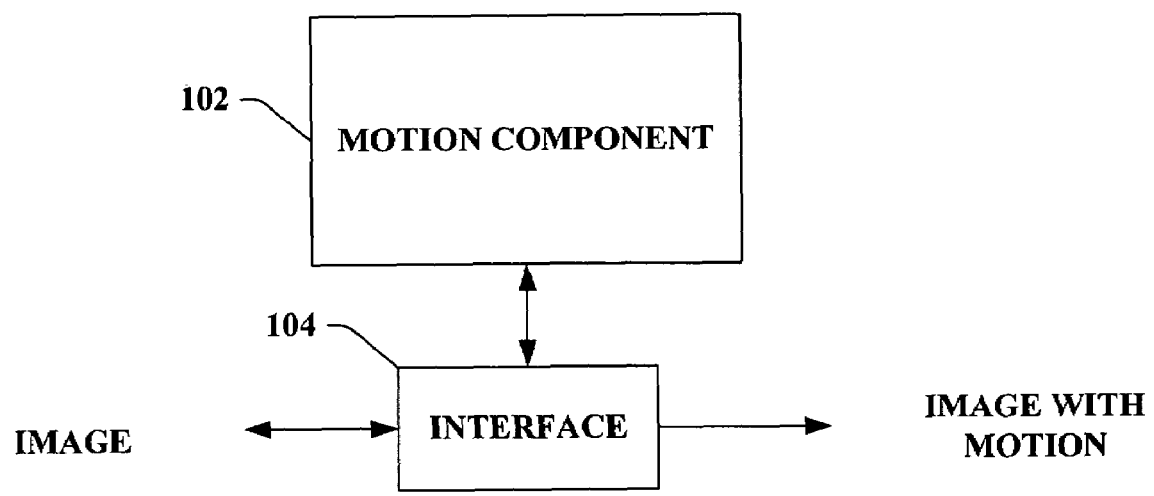
FIG. 1 illustrates a block diagram of an exemplary system that facilitates generating an image-based video.

As utilized in this application, terms "component," "system," "store," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates generating a motion for an image in order to create an image-based video. A motion component 102 can receive the image and generate a corresponding motion for the image. Such motion can mitigate complications involved with creating an image-based video. Once the motion is applied/generated, a set of images (e.g., the image and/or a plurality of images) with motion can be accumulated to allow an application to present a set, which provides an aesthetic slide show with motion. It is to be appreciated and understood that the motion can include a pan, a zoom, a pan and zoom, a transition between adjacent images, and/or any combination thereof.

The motion component 102 can receive multiple images, wherein each image can have a respective motion applied thereto. Each motion generated and/or applied by the motion component 102 is particular to the image based at least upon an image characteristic and/or the aspect ratio of resulting video. It is to be appreciated that the motion can be generated based upon a resulting video aspect ratio, wherein the resulting video aspect ratio is where the image-based video is displayed and/or presented. Additionally, the display and/or presentation can include a TV, a monitor, a flat screen, a cell phone display, a PDA display, and a projector display. By optimizing the particular motion applied to the image, the end compilation of images is an automatically generated, aesthetically pleasing image presentation in the form of image-based video. The motion component 102 can automatically generate motion for images without any user interaction; however, the subject invention can include a user manipulation and/or guidance in relation to a setting and/or a configuration associated with motion utilized with images in the image-based video (e.g., a color, a speed, a path, a size, an order, . . . ).

For example, an image (e.g., digital image) can be obtained by the motion component 102, wherein a user anticipates creating a presentation of such image involving an image-based video. Based at least upon an image characteristic and/or a resulting video aspect ratio, the motion component 102 can apply the motion to the image in accordance with the image characteristics and/or a resulting video aspect ratio such that the motion is aesthetically pleasing to the user. For instance, a panning motion can be applied to a horizontal panoramic image since the image characteristics (e.g., horizontal panoramic) are conducive to a pan in comparison to other possible motions. The motion component 102 can further provide a default setting, wherein an image with a caption (e.g., text, an edit, . . . ) can be considered static. In other words, the motion component 102 can have a default setting that does not generate and/or apply motion to images that contain caption. It is to be appreciated that this default setting can be changed based at least in part upon a user preference.

The system 100 further includes an interface component 104, which provides various adapters, connectors, channels, communication paths, etc. to integrate the motion component 102 into virtually any operating system. In addition, the interface component 104 can provide various adapters, connectors, channels, communication paths, etc. that provide for interaction with images regardless of a format (e.g., BMP, JPEG, GIF, TIF, . . . ), a size, a resulting video aspect ratio, and/or an associated property. It is to be appreciated that although the interface component 104 is incorporated into the motion component 102, such implementation is not so limited. The interface component 104 can be a stand-alone component to receive or transmit the image, the resulting video, and/or the image with motion (respectively) in relation to the system 100.

Figure 2:
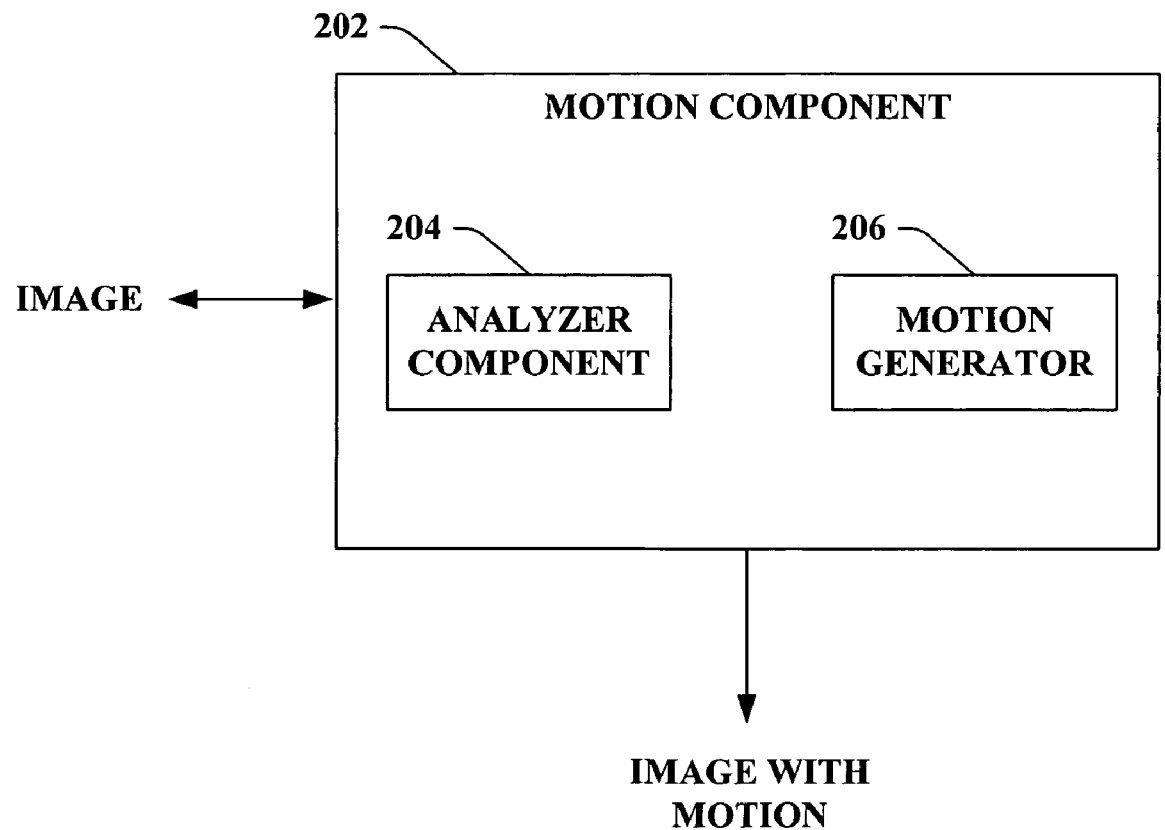
FIG. 2 illustrates a block diagram of an exemplary system that facilitates generating an image with an associated motion calculated based in part upon an image characteristic and/or an aspect ratio of resulting video.

FIG. 2 illustrates a system 200 that facilitates applying a motion automatically to an image, based at least upon a characteristic of the image and/or a resulting video aspect ratio, which can be utilized in an image-based video. A motion component 202 can receive a resulting video aspect ratio (e.g., the resulting video is where the image-based video is displayed and/or presented) and an image having various characteristics associated thereto, wherein at least a resulting video aspect ratio and one characteristic of the image can be a basis for determining, and/or applying the motion. It is to be appreciated that the motion component 202 can receive the image and/or manipulate the image in a remote location. In other words, the motion component 202 can apply the motion to an image located in a data store (not shown), which can be an external component located on a remote and/or distributed system.

The motion component 202 can include an analyzer component 204 that analyzes the characteristic related to the image and a resulting video aspect ratio. The image, which can be a digital image, can include a plurality of characteristics such as, but not limited to, a format, an image size, and an aspect ratio. Furthermore, the analyzer component 204 can determine a reference rectangle based on a resulting video aspect ratio. A reference rectangle can be defined for the image as a virtual rectangle with an aspect ratio equal to a resulting video aspect ratio (created with the substantially similar width or height as the image). For instance, when the image aspect ratio is the substantially similar as that of the resulting video, the reference rectangle is substantially similar as the image. When the image aspect ratio is not equal to that of the resulting video, the reference rectangle is larger than the image and the image is centered in the reference rectangle. It is to be appreciated that the motion component 202 can include a crop component (not shown) such that the image can be cropped to match a resulting video aspect ratio in order to facilitate applying the motion to the image. For example, if the aspect ratio of the entire image does not match the aspect ratio of the resulting video, the reference rectangle contains the entire picture and also horizontal (or vertical) black borders on two opposite sides, enveloping the image to compensate for the difference in aspect ratios. The decision of whether to crop the image to match the aspect ratio of the resulting video can be based upon, amongst other factors, the amount of enveloping black space (e.g., a space that is within the reference rectangle and not occupied by the image) that would have to be included in the reference rectangle in the absence of cropping.

Figure 3:
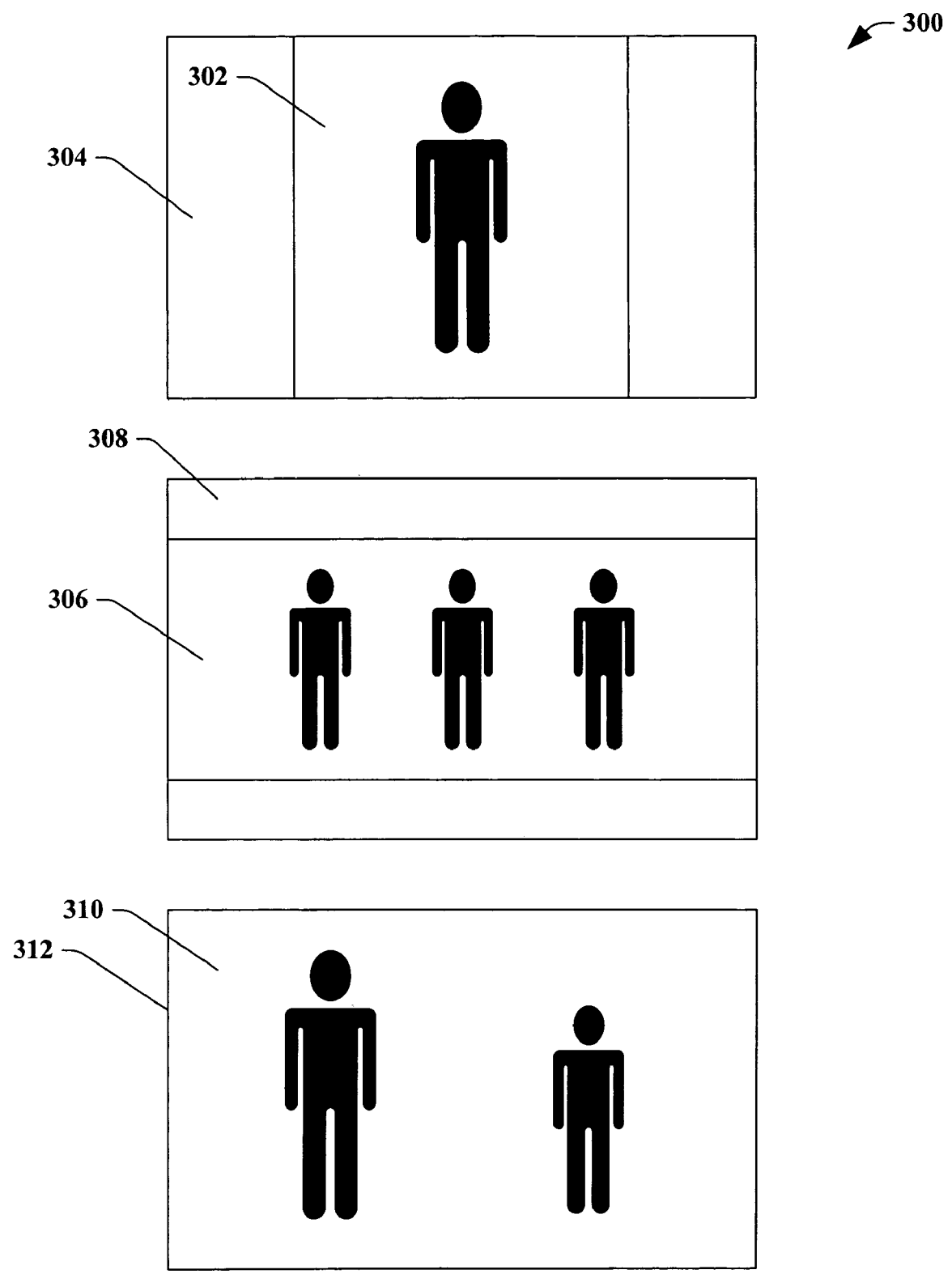
FIG. 3 illustrates a diagram of a plurality of reference rectangles for images of different aspect ratios.

Briefly referring to FIG. 3, a series of reference rectangles is illustrated in accordance with the subject invention to emphasize the definition of the reference rectangle. An aspect ratio of the resulting video can be, for instance, 4:3. The reference rectangle can be a virtual rectangle with an aspect ratio equal to the aspect ratio of the resulting video. Thus, a resulting video aspect ratio and the reference rectangle can both be 4:3. A first image 302 can have an aspect ratio less than 4:3 in relation to a first reference rectangle 304. A second image 306 can have an aspect ratio greater than 4:3 in comparison to a reference rectangle 308. Furthermore, an aspect ratio of a third image 310 can be equal to a reference rectangle 310. It is to be appreciated that the reference rectangle and the resulting video can have any aspect ratio, and the subject invention is not so limited to the ratio of 4:3. Similarly, the aspect ratio of the reference rectangle can be different from the aspect ratio of the resulting video without diverging from the scope of this invention—however ensuring that the reference rectangle has the substantially similar aspect ratio as the resulting video facilitates generating aesthetically pleasing motion and such is assumed in the following discussion.

Turning back to FIG. 2, the motion component 202 can further include a motion generator 206 that generates and applies the motion to the image based at least upon the image characteristic and the reference rectangle (the virtual rectangle with the aspect ratio equal to the resulting video). The motion generator 206 defines the motion with a start rectangle and an end rectangle. The start rectangle and the end rectangle can have the same aspect ratio as the reference rectangle, which also has the same aspect ratio as the resulting video. It is to be appreciated that the motion generator 206 can provide a linear motion from the start rectangle to the end rectangle, wherein the motion can be, but is not limited to, a pan, a zoom, and/or a pan and zoom. It is to be appreciated that the motion can be linear in respect to time and/or non-constant.

Figure 4:
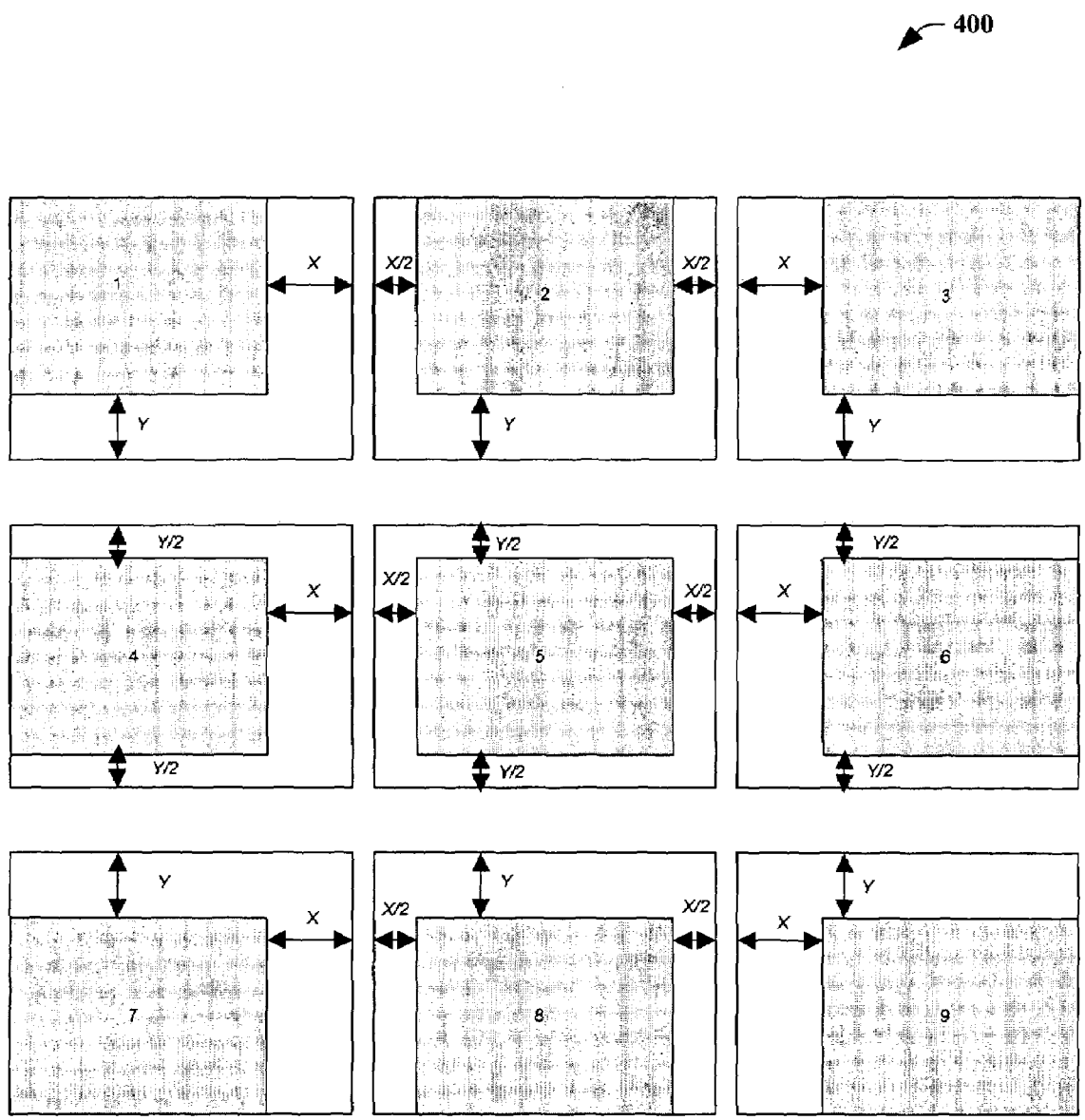
FIG. 4 illustrates a diagram of a number of sub-rectangles creating a sub-rectangle grid that is utilized in conjunction with the subject invention.

The motion generator 206 can divide the reference rectangle into a subset of rectangular areas in order to facilitate generating and/or applying the motion to the image. For instance, FIG. 4 illustrates a division technique 400 of the reference rectangle such that nine overlapping sub-rectangular areas are depicted collectively referred to as a sub-rectangle grid. In particular, the division technique 400 provides a unit X and a unit Y, wherein X is defined as percentage of a width of the reference rectangle (e.g., a quarter of the width of the reference rectangle) and Y is a percentage of a height of the reference rectangle (e.g., a quarter of the height of the reference rectangle). The sub-rectangles utilized can be substantially similar in size. Moreover, the resulting video aspect ratio can be a basis for the sub-rectangle sizes. For instance, if the resulting video has an aspect ratio of 4:3, the sub-rectangles can be 9/16 of the size of the reference rectangle. In one example, the sub-rectangles can be produced by dividing the reference rectangle into equal number of rows and columns. It is to be appreciated and understood that the reference rectangle can be divided into a number of divisions facilitate generation of image-based video, and such number of divisions is not so limiting.

The motion generator 206 can utilize one of the sub-rectangles as the start rectangle and/or end rectangle. For instance, the start rectangle can be a subset of the reference rectangle, which is displayed in the video when the image first appears in the image-based video. The image can then move in the image-based video in a panning and/or a zooming motion such that the end rectangle is the subset of the reference rectangle, which is displayed in the image-based video when the motion of the image is complete. In other words, the start rectangle is a first frame of the motion and the end rectangle is a last frame of the motion of the image.

Furthermore, in order to determine the start rectangle and the end rectangle, the motion generator 206 can apply a heuristic rule that can depend upon a difference between the aspect ratio of the image and the aspect ratio of the resulting video. In one example, a difference in ratios can be divided into the following categories: 1) the aspect ratio of the image is significantly small in comparison to the aspect ratio of the resulting video; 2) the aspect ratio of the image is slightly smaller than the aspect ratio of the resulting video; 3) the aspect ratio of the image is equal to the aspect ratio of the resulting video; 4) the aspect ratio of the image is slightly larger than the aspect ratio of the resulting video; and 5) the aspect ratio of the image is significantly large in comparison to the aspect ratio of the resulting video. The above categories can utilize a lower threshold and a higher threshold to designate a lower limit and a higher limit.

For example, the aspect ratio of the resulting video can be 4:3 (1.3333). Based at least upon the categories defined above, the motion generator 206 can utilize one of an aspect ratio spectrum rule. The aspect ratio spectrum rules can be defined within the confines of categories above. Note that the aspect ratio of the resulting video and the aspect ratio threshold values discussed below are only an example-other aspect ratios of resulting video and other threshold values can be utilized without diverging from the scope of this invention.

1) If the aspect ratio of the image is smaller than 0.6 (e.g. a vertical panorama), the motion generated and/or applied is a panning motion from top to bottom or bottom to top. Ideally, no zoom should be applied to provide an aesthetic viewing pleasure. Additionally, the start rectangle is substantially similar in size as the end rectangle. To improve viewing experience, the size and position of the start and end rectangle is chosen in a way that both contain portions of the reference rectangle that include the image and do not contain any portion of the reference rectangle that includes black borders. The entire original image is viewed over the course of the panning motion.

2) If the aspect ratio is greater than or equal to 0.6 and less than 1.3333, a degree of randomness can be applied in generating the motion to introduce some variety in motion for images with aspect ratios close to that of a portrait image even at expense of sometimes showing vertical black borders of the envelope. In particular, a rule can be implemented that ensures that there is a ⅓ probability that the motion is a panning motion (e.g., from top to bottom or bottom to top with no zooming); and a ⅔ probability that the motion includes a zoom and pan. In the possibility of the panning motion, the start rectangle and the end rectangle can be positions two and eight in FIG. 4 respectively. It is to be appreciated that the start rectangle and the end rectangle can be sub-rectangle eight and two in FIG. 4 respectively. In the possibility of the zoom and pan, one of the motion rectangles (start rectangle or end rectangle) is the reference rectangle and the other rectangle is one of the sub-rectangles in the center column (e.g., sub-rectangle two, five, or eight) in FIG. 4.

3) When the aspect ratio is equal to 1.3333, one of the motion rectangles (start rectangle or end rectangle) is the reference rectangle and the other is one of the sub-rectangles based upon the division (e.g., one of the nine sub-rectangles in FIG. 4). By following this technique, it ensures the full image content is displayed at least once during the image-based video playback. It is to be appreciated that this type of motion involves zooming, wherein the zooming direction is determined by whether the reference rectangle is the start rectangle or the end rectangle. Moreover, a selection of the sub-rectangles can be determined by a random number generator (not shown). Thus, a degree of randomness in the variety of motion is provided when automatically creating image-based video.

4) When the aspect ratio is greater than or equal to 1.3333 and less than 2.0, a degree of randomness can be applied to the motion generated to introduce some variety in motion for images with aspect ratios close to 3:2 (popular with many digital SLR cameras) even at the expense of sometimes showing horizontal black borders of the envelope. In particular, a rule can be implemented that ensures that there is a ⅓ probability that the motion is a panning motion (e.g., from left to right or right to left with no zooming). In addition, there is a ⅔ probability that the motion includes a zoom and pan. In the probability that the motion is a pan, the start rectangle and the end rectangle are sub-rectangle four and sub-rectangle six in FIG. 4 respectively, or vice versa. In the probability that the motion is the zoom and pan, one of the motion rectangles (start rectangle or end rectangle) is the reference rectangle and the other is one of the sub-rectangles in the center row (e.g., sub-rectangle four, five, or six in FIG. 4).

5) If the aspect ratio is greater than 2 (e.g., horizontal panorama), the motion applied is a panning motion from left to right or right to left. Ideally, no zoom should be applied and the start rectangle is substantially similar in size as the end rectangle. To improve viewing experience, the size and position of the start and end rectangle is chosen in such a way that both contain portions of the reference rectangle that include the image and do not contain any portion of the reference rectangle that includes black borders. The entire original image is viewed over the course of the panning motion.

Figure 5:
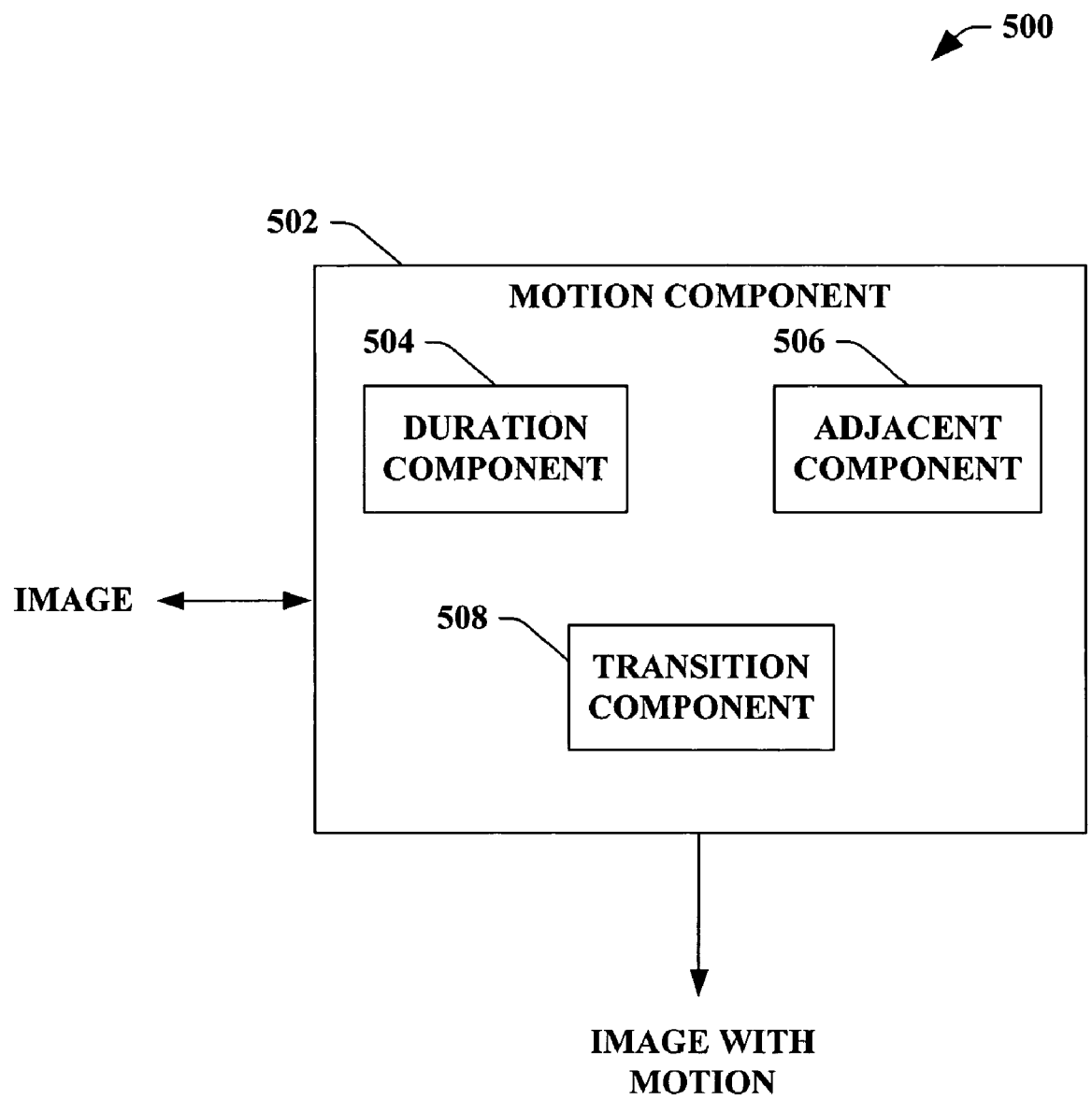
FIG. 5 illustrates a block diagram of an exemplary system that facilitates applying motion to an image used in creation of an image-based video.

FIG. 5 illustrates a system 500 that facilitates applying a motion automatically to an image based at least upon a characteristic of the image and a resulting video aspect ratio, which can be utilized in an image-based video. A motion component 502 can receive an image and generate a corresponding motion to the image to mitigate complications involved with instantiating an image-based video. Once the motion is generated with the image, a set of generated images with motion can be compiled allowing an application to present the set, which provides an aesthetic slide show that incorporates motion. Furthermore, the image received by the motion component 502 can include a TIF image, a GIF image, a BMP image, a JPEG image, etc. It is to be appreciated that the motion component 502 can be substantially similar to the motion component 202 of FIG. 2, and motion component 102 of FIG. 1.

The motion component 502 can include a duration component 504 that can automatically determine the amount of time the image appears in the image-based video presentation with the motion applied to the image. For instance, if the motion is too fast, a viewer cannot experience the image-based video clearly. On the other hand, if the motion is too slow, the viewer will experience a dull and/or boring image based-video. Similarly, if subsequent images have different perceived speeds, the overall video can appear jarring and/or discontinued.

The duration component 504 can implement a technique in order to automatically determine a motion duration ($T_z$) by utilizing a zooming motion distance ($D_z$), and a preferred motion speed (e.g., $S_p$ for panning motion and $S_z$ for zooming motion). The preferred motion speed can be predefined and utilized throughout the image-based video. Additionally, a minimum image duration (Tmin) can also be pre-defined. The duration component 504 can implement the following to calculate the zooming distance $D_z$ and the corresponding motion duration $T_z$:

$$D_z = \sqrt{(w_{end} - w_{start})*(w_{end} - w_{start}) + (h_{end} - h_{start})*(h_{end} - h_{start})},$$

wherein, $w_{start}$ and $h_{start}$ are a width and a height of a start rectangle, respectively and $w_{end}$ and $h_{end}$ are a width and a height of an end rectangle, respectively. By dividing $D_z$ by the preferred motion speed for zooming ($S_z$), the motion duration ($T_z$) can be calculated.

Similarly, a panning motion distance ($D_p$) and a motion duration ($T_p$) can be determined by the duration component 504. The following can be implemented:

$$D_p = \sqrt{(x0_{end} - x0_{start})*(x0_{end} - x0_{start}) + (y0_{end} - y0_{start})*(y0_{end} - y0_{start})},$$

wherein $x0_{start}$ and $y0_{start}$ are a pair of coordinates associated to an upper-left corner of the start rectangle and $x0_{end}$ and $y0_{end}$ are a pair of coordinates associated to an upper-left corner of the end rectangle. The motion duration ($T_p$) can be calculated by dividing $D_p$ by the preferred motion speed for panning ($S_p$). Furthermore, the duration component 504 can determine the recommended image duration (T) for the motion as the maximum of the motion duration ($T_z$), motion duration ($T_p$) and the minimum image duration Tmin (T=max ($T_z$, $T_p$, Tmin)).

It is to be appreciated that the duration of the motion over the image can be automatically calculated by the duration component 504 with little or no user interaction. Thus, when a user manually customizes the motion over the image, the duration for the motion is still automatically calculated. For instance, a default motion over a 4:3 aspect ratio picture is automatically determined, but if the user manually adjusts the motion for a deeper zoom, the duration for the motion is recalculated utilizing the rules stated supra. This provides uniformity with the pace of the image-based video regardless of customized motion without requiring users to manually adjust duration of motion whenever they manually update the motion for an image. Giving the user the ability to configure the preferred motion speed and the minimum duration provides the user with the ability to adjust the pace of the automatically calculated motion once and then rely on the duration component 504 to utilize the preferred pace of motion over images throughout the image-based video.

The motion component 502 can further include an adjacent component 506 that provides a motion sequence for adjacent images within the image-based video. The adjacent component 506 can determine direction of motion for the adjacent images to create an aesthetically pleasing video experience. It is to be appreciated that the direction of motion (e.g., direction of zoom and/or pan) can be determined after the motion is determined for individual images. For instance, after motion for the individual image is determined to be a zoom, the direction of motion can be simplified to determining a zoom direction (e.g., a zoom-in and/or a zoom-out). Thus, a set of rules can be imposed by the adjacent component 506 in order to facilitate determining the motion direction. The set of rules can be as follows: 1) if the aspect ratio of the first input image is substantially similar to the aspect ratio of the resulting video, the motion for the first image is always a zoom-in from the reference rectangle to the center rectangle (e.g., sub-rectangle 5 in FIG. 4); 2) if the aspect ratio of the last input image is substantially similar to the aspect ratio of the resulting video, the motion for the last image is a zoom-out from the center sub-rectangle (sub-rectangle 5 in FIG. 4) to the reference rectangle; and 3) it is preferable to not change both the zooming and the panning directions simultaneously in adjacent images. In this example, the first two rules provide aesthetically pleasing starts and finishes to the image-based video, while the last rule can avoid drastic motion change that leads to abrupt or disconnected visual experience.

The motion component 502 can include a transition component 508 that provides a transition between adjacent images (e.g., a first image and a second image). The transition can include a wipe, a fade, a cross-fade, an explode, an implode, a matrix wipe, a push, a dissolve, a checker, and any other transitions utilized in video post production. The transition component 508 can equally distribute the transition duration across the duration of the current image and the duration of the previous image. It is to be appreciated that the maximum duration of transition between two subsequent images is equal to a smaller duration of each of the two subsequent images.

Figure 6:
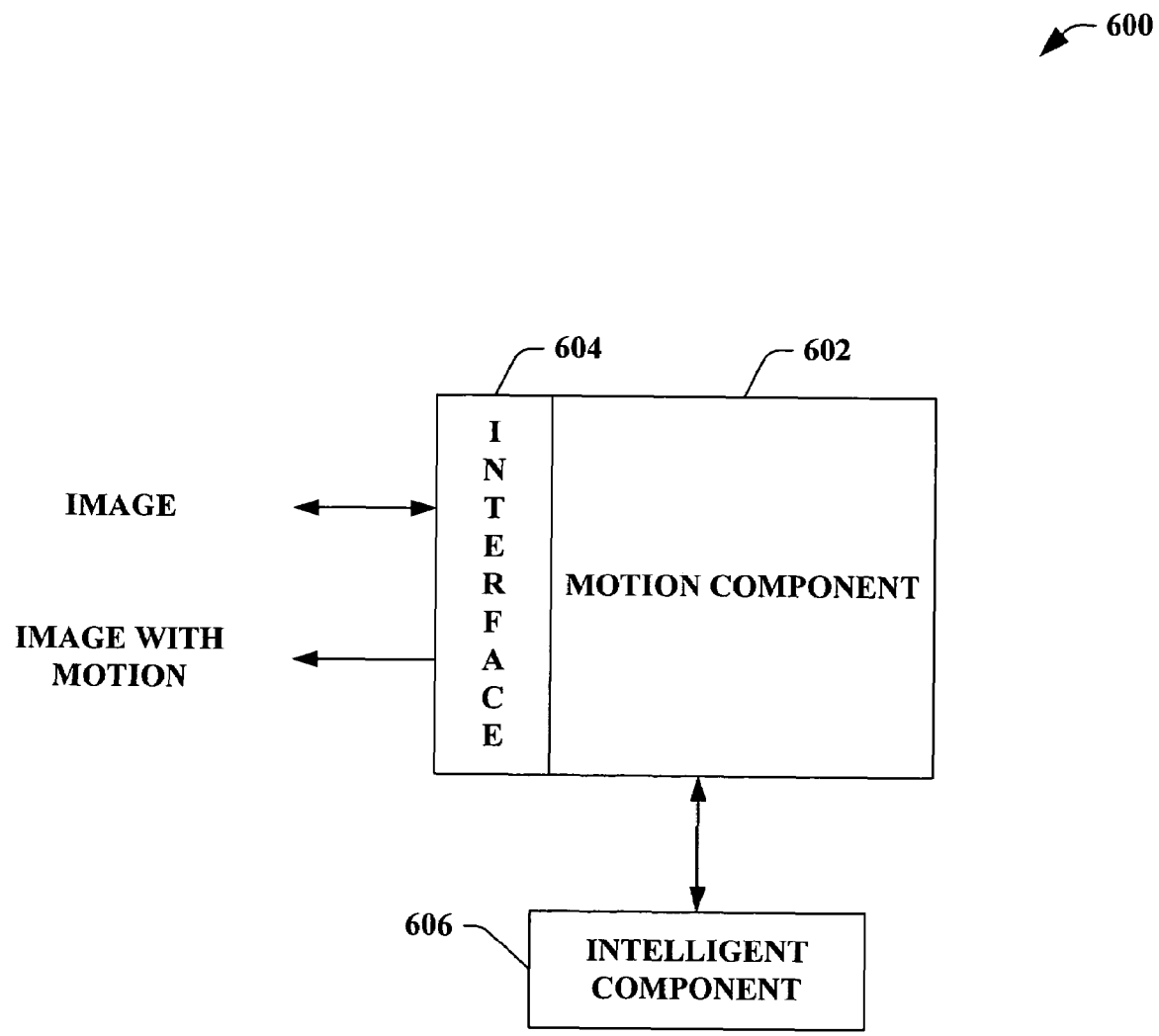
FIG. 6 illustrates a block diagram of an exemplary system that facilitates generating an image with an associated motion calculated based in part upon an image characteristic and/or a resulting video aspect ratio.

FIG. 6 illustrates a system 600 that employs intelligence to facilitate discovering and determining a motion to generate and/or apply to an image. The system 600 includes a motion component 602, and an interface 604. As described in detail above the motion component 602 can generate and/or apply the motion to the image based at least upon an image characteristic and/or a resulting video aspect ratio. The motion component 602 can provide motion to the image regardless of a format, a size, and/or a particular motion applied. Furthermore, the motion component 602 can be utilized to provide a respective motion to a specific image or for a plurality of images to be incorporated within an image-based video.

The system 600 further includes an intelligent component 606. The intelligent component 606 can be utilized by the motion component 602 to facilitate invoking a respective function. For example, the intelligent component 606 can be utilized to facilitate applying and/or generating the motion with the image. For example, various images can be one of many file formats. The intelligent component 606 can determine the image format, convert the image, manipulate the image, and/or import the image without a format change. In another example, the intelligent component 606 can infer the motion to be applied to the image based at least upon a user history and/or a previous image-based video(s).

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
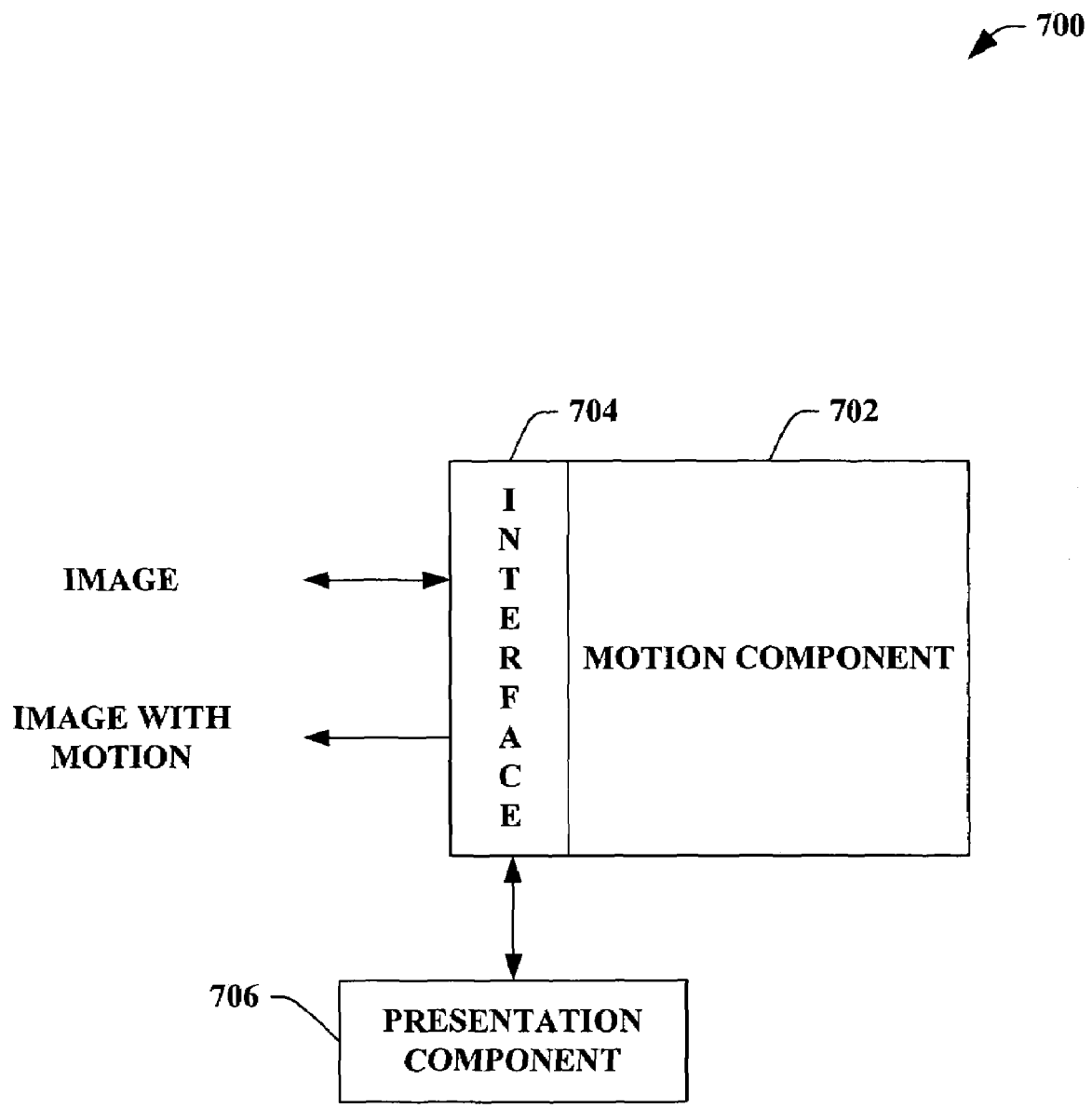
FIG. 7 illustrates a block diagram of an exemplary system that facilitates generating an image with an associated motion calculated based in part upon an image characteristic and/or a resulting video aspect ratio.

FIG. 7 illustrates a system 700 that facilitates generating and/or applying a motion to an image based upon an image characteristic and/or a resulting video aspect ratio. A motion component 702 can receive the image and automatically generate and/or apply the motion to the image to provide an aesthetically pleasing image-based video. An interface component 704 can receive the image, transmit the image with motion, and/or provide other communications associated to the motion component 702. In addition, the motion component 702 can interact with a presentation component 706. The presentation component 706 can provide various types of user interfaces to facilitate interaction between a user and the interface component 704 and any component coupled to the interface component 704. As depicted, the presentation component 706 is a separate entity that is coupled to the interface component 704. However, it is to be appreciated that the presentation component 706 and/or similar presentation components can be incorporated into the motion component 702, and/or a stand-alone unit.

The presentation component 706 can provide one or more graphical user interfaces (GUIs), command line interfaces, and the like. For example, a GUI can be rendered that provides a user with a region or means to load, import, read, etc. data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities can be employed to facilitate the presentation of such vertical and/or horizontal scroll bars for navigation and toolbar buttons to determine whether a region will be viewable. For example, the user can interact with one or more of the components coupled to the interface component 704.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate an action. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
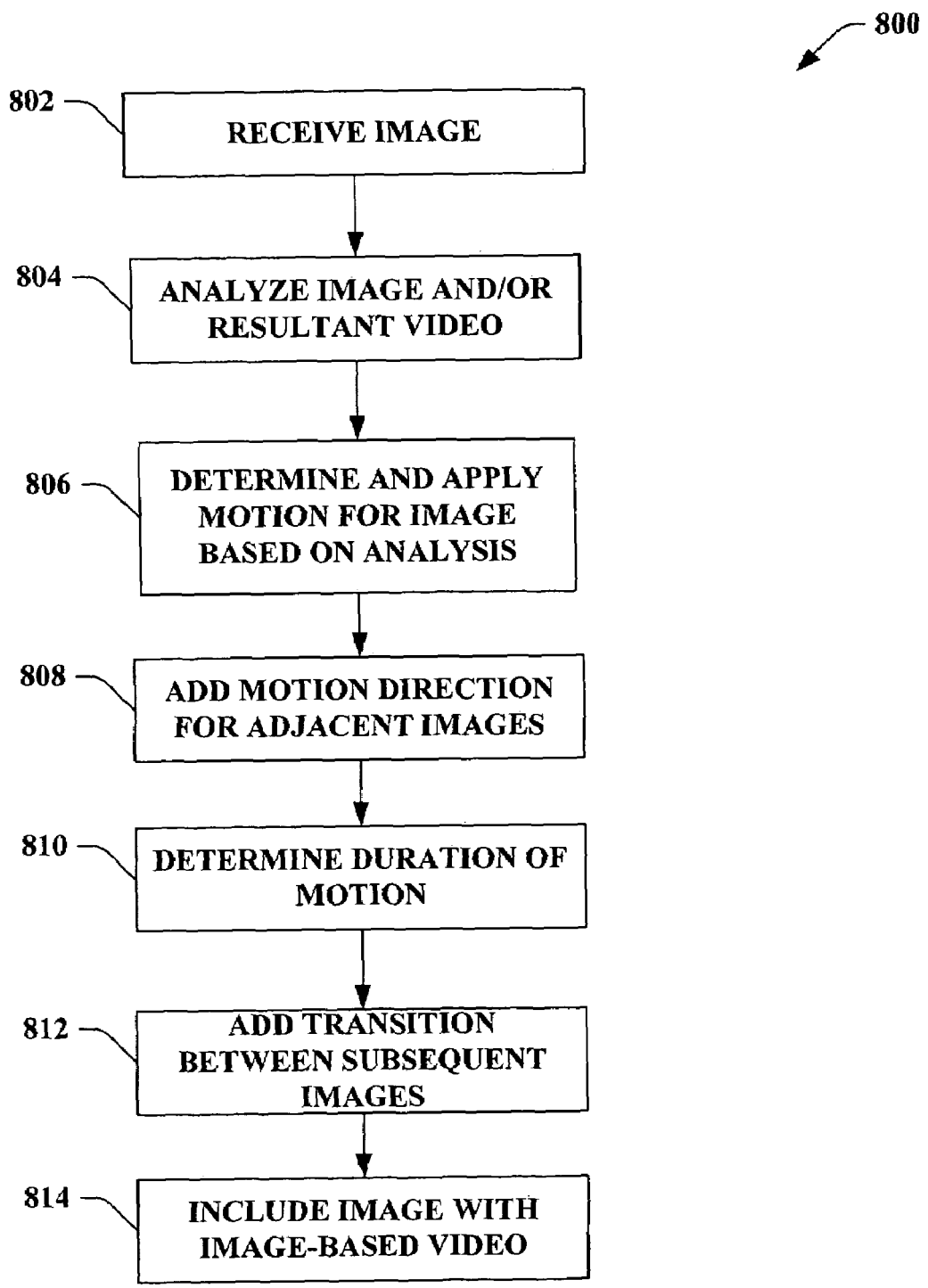
FIG. 8 illustrates an exemplary methodology for creating an image with a respective motion based at least in part upon an image characteristic and/or a resulting video aspect ratio.
Figure 9:
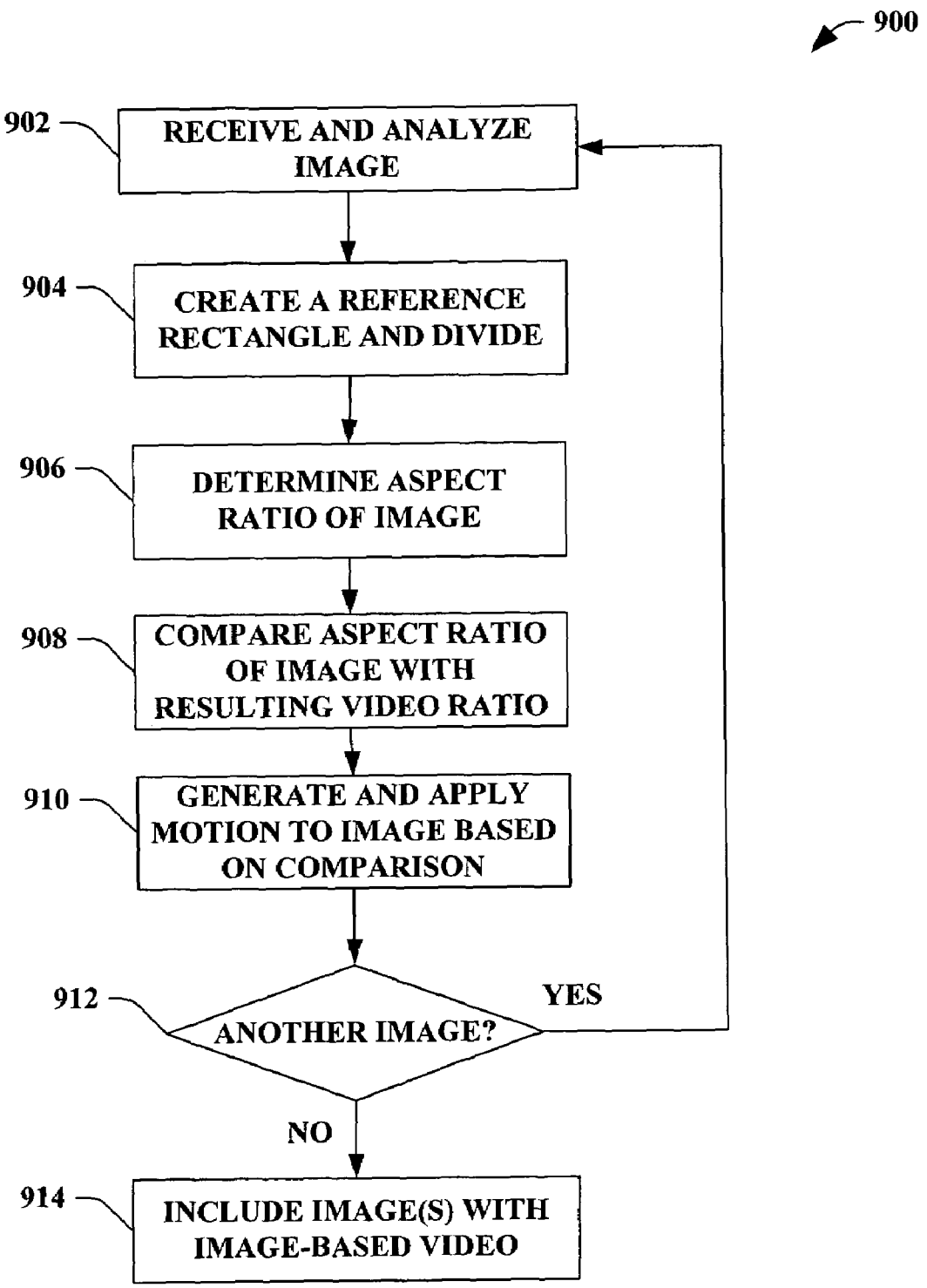
FIG. 9 illustrates an exemplary methodology for creating an image with a respective motion based at least in part upon an image characteristic and/or a resulting video aspect ratio.

FIGS. 8-9 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 8 illustrates a methodology 800 that facilitates automatically generating and/or applying a motion to an image to be employed in an image-based video. At reference numeral 802, the image is received. The image can be, but is not limited to, a BMP image, a TIF image, a JPEG image, a vertical panoramic image, a horizontal panoramic image, etc. It is to be appreciated that the subject invention is not limited by a characteristic of the image, which can include, a file size, a file type, an image size, an image format, and an image aspect ratio. Next at reference numeral 804, the image (and associated characteristics) and/or a resulting video aspect ratio are analyzed as the basis for the motion applied and/or generated to such image. The motion can include a pan, a zoom, a pan and zoom, and/or a combination thereof.

At reference numeral 806, the motion is determined and calculated for the image based at least in part upon the analysis of the image (and associated characteristics) and/or the resulting video aspect ratio. The motion determined and calculated can be applied to the image to create the image-based video. Turning to reference numeral 808, a motion direction can be added for adjacent images. The motion applied to a second image (e.g., the motion direction) can be based at least in part upon the motion applied to an adjacent, previous first image. At 810, a motion duration is calculated, wherein the motion duration can be a length of time for which the image appears in the image-based video with the motion applied to the image. The motion duration can be determined by a preferred motion speed, a minimum image duration time, and the motion (e.g., a zoom and/or a pan). At reference numeral 812, a transition can be applied between subsequent images. Next at reference numeral 814, the image with motion can be included in the image-based video to be presented.

FIG. 9 illustrates a methodology 900 that facilitates creating an image with a respective motion based upon an image characteristic and/or a resulting video ratio. At reference numeral 902, the image is received and analyzed. The analysis can include a determination on a resulting video aspect ratio and/or the image characteristic. Next at reference numeral 904, a reference rectangle is created and divided accordingly into overlapping sub-rectangle areas (See FIG. 4). The reference rectangle is a virtual rectangle of an aspect ratio equal to an aspect ratio of the resulting video, created with the substantially similar width or the substantially same height as the image. The reference rectangle can be divided into sub-rectangular areas to create a sub-rectangle grid, having a same number of rows as columns. In one example, the reference rectangle is divided into X (e.g., nine) overlapping sub-rectangular areas. It is to be appreciated that the aspect ratio of each sub-rectangle can be substantially similar to the aspect ratio of the reference rectangle and are substantially similar in size. For instance, if the resulting video has the aspect ratio of 4:3, the sub-rectangular areas can be 9/16 of the size of the reference rectangle.

At 906, the aspect ratio of the image is determined and utilized in conjunction with applying the motion to such image. Next at reference 908, the aspect ratio of the image is compared with a resulting video aspect ratio. Based on a pre-determined group of categories (wherein the categories are separated by the comparison), the motion can be automatically generated and applied at reference numeral 910. For example, the comparison can be categorized by the following: 1) the aspect ratio of the image is very small in comparison to the aspect ratio of the resulting video; 2) the aspect ratio of the image is slightly smaller than the aspect ratio of the resulting video; 3) the aspect ratio of the image is equal to the aspect ratio of the resulting video; 4) the aspect ratio of the image is slightly larger than the aspect ratio of the resulting video; and 5) the aspect ratio of the image is very large in comparison to the aspect ratio of the resulting video. It is to be appreciated and understood that a low threshold and a high threshold can be established to invoke a lower limit and a higher limit for the comparison categories. Similarly fewer or more categories and corresponding thresholds can be utilized. At 912, a determination is made whether another image exists to which motion is to be automatically applied and/or generated. If there is another image, the method continues at 902. If there is not another image, the method proceeds to reference numeral 914, where the image(s) are included with the image-based video.

Figure 10:
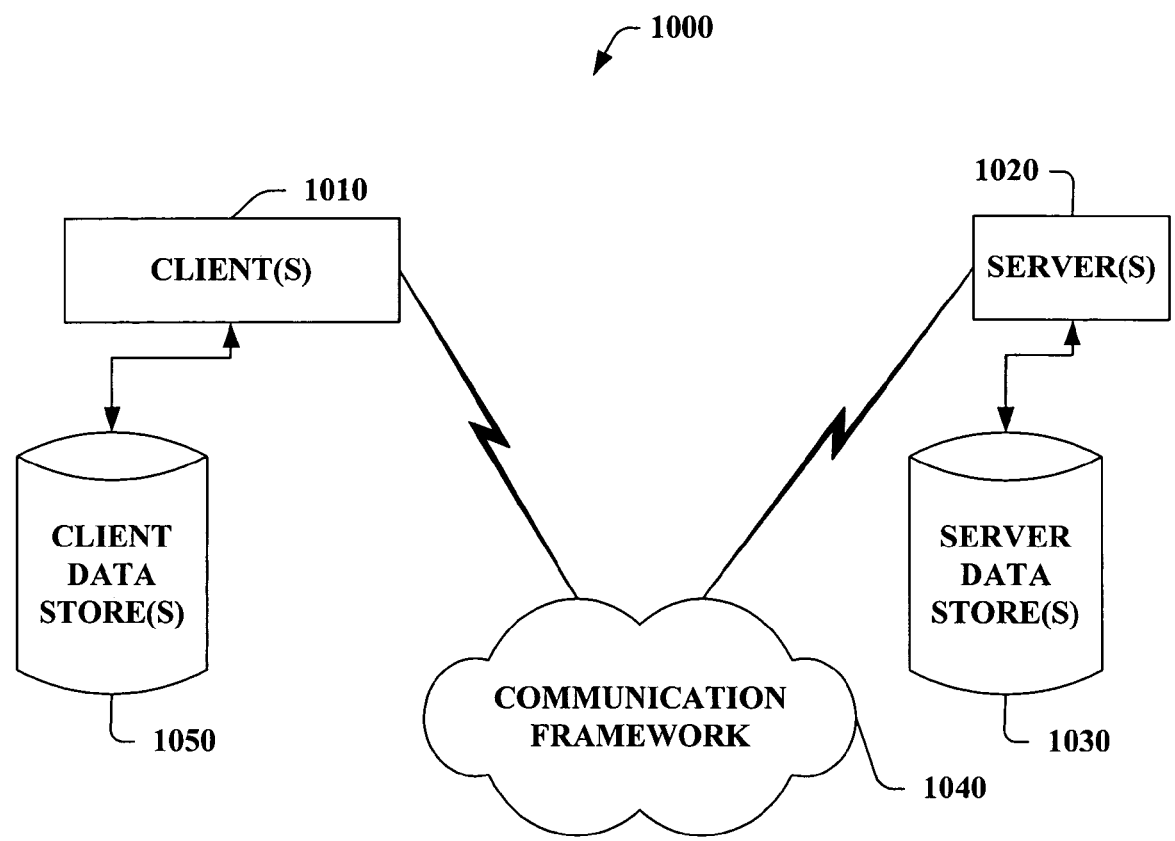
FIG. 10 illustrates an exemplary networking environment, wherein the novel aspects of the subject invention can be employed.
Figure 11:
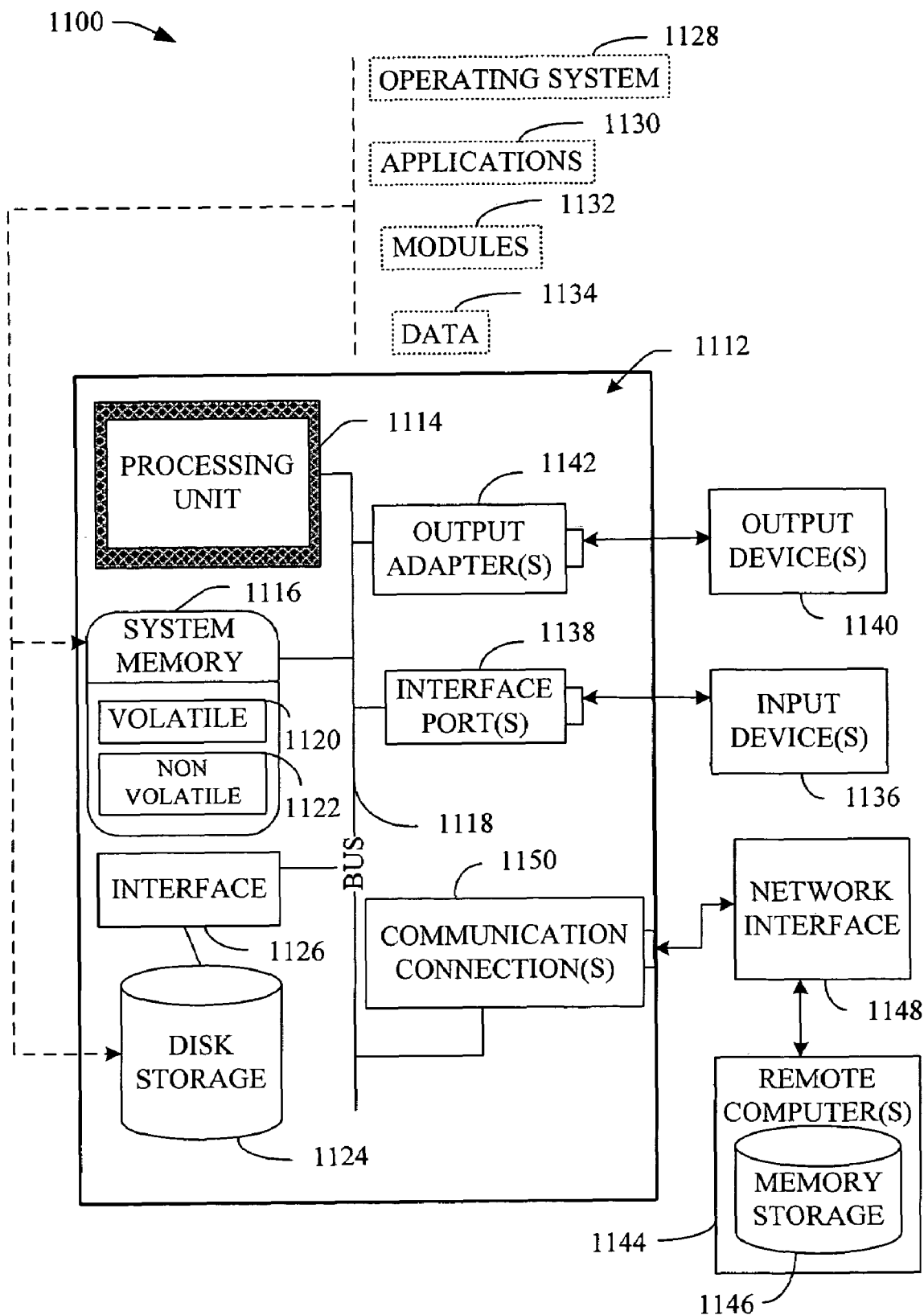
FIG. 11 illustrates an exemplary operating environment that can be employed in accordance with the subject invention.

In order to provide additional context for implementing various aspects of the subject invention, FIGS. 10-11 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject invention, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates creating an image-based video, comprising:
   a component that receives a resulting video aspect ratio and an image;
   a motion component that automatically generates and applies a motion to the image based at least in part upon a comparison of an aspect ratio of the image and the resulting video aspect ratio; and
   a reference rectangle that is a virtual rectangle of aspect ratio equal to the aspect ratio of a resulting video and created with a substantially similar width or a substantially similar height as the image.

2. The system of claim 1, the motion is one or more of the following: a pan; a zoom; a pan and zoom; a transition; and a combination thereof.

3. The system of claim 1, further comprising a motion generator that generates and applies the motion based in part upon the comparison.

4. The system of claim 1, further comprising a component that can do one or more of the following: (1) crop the image to a substantially similar ratio as a resulting video aspect ratio; (2) determine at least one of a panning and zooming motion for an image (3) determine a motion direction for a second image based at least upon the motion applied to an adjacent previous first image; (4) calculate a duration for which the image appears in the image-based video with the motion applied; and (5) determine a duration of a transition between subsequent images by analyzing an overall motion duration of each of the two subsequent images.

5. The system of claim 4, the duration component calculates a motion duration ($T_z$) for a zoom with the following: ($D_z$)/($S_z$), where $$D_z = \sqrt{(w_{end} - w_{start}) * (w_{end} - w_{start}) + (h_{end} - h_{start}) * (h_{end} - h_{start})},$$

and a $D_z$ is a zooming motion distance, a $w_{start}$ is a width of a start rectangle, an $h_{start}$ is a height of the start rectangle, a $w_{end}$ is a width of an end rectangle, an $h_{end}$ is a height of the end rectangle, and $S_z$ is a preferred motion speed for zooming.

6. The system of claim 4, the duration component calculates a motion duration ($T_p$) for a pan with the following: ($D_p$)/($S_p$), where $$D_p = \sqrt{(x0_{end} - x0_{start}) * (x0_{end} - x0_{start}) + (y0_{end} - y0_{start}) * (y0_{end} - y0_{start})},$$

and a $D_p$ is a panning motion distance, an $x0_{start}$ is an upper-left corner coordinate of a start rectangle, a $y0_{start}$ is an upper-left coordinate of the start rectangle, an $x0_{end}$ is an upper-left coordinate of an end rectangle, a $y0_{end}$ is an upper-left coordinate of the end rectangle, and $S_p$ is a preferred motion speed for panning.

7. The system of claim 1, the reference rectangle is divided into a number of overlapping sub-rectangular areas, with an equal number of rows and columns to create a sub-rectangle grid, wherein the motion contains a start rectangle and an end rectangle, the start rectangle and the end rectangle have an aspect ratio equivalent to the resulting video aspect ratio and the reference angle.

8. The system of claim 7, the comparison is a numeric difference of the aspect ratio of the image and the resulting video aspect ratio, the motion automatically applied to the image is as follows:
   a) When the aspect ratio of the image is smaller than a lower threshold, the motion applied is a vertical panning motion with no zoom and the start rectangle is substantially similar in size as the end rectangle;
   b) When the aspect ratio of the image is greater than or equal to the lower threshold and less than the resulting video aspect ratio, the motion is one of:
      i) a panning motion with the start rectangle as a sub-rectangle in a center position on one of: a top row of the sub-rectangle grid or a bottom row of the sub-rectangle grid, and the end rectangle is a sub-rectangle in a center position on one of: a bottom row of the sub-rectangle grid or a top row of the sub-rectangle grid; and
      ii) a zoom and a pan motion with the start rectangle and the end rectangle being one of the reference rectangle and a center column sub-rectangle on the sub-rectangle grid;
   c) When the aspect ratio of the image is equal to the resulting video aspect ratio, the motion applied is a zoom with one of the motion rectangles (the start rectangle or the end rectangle) being the reference rectangle, and the other is one of a sub-rectangles on the sub-rectangle grid;
   d) When the aspect ratio of the image is greater than or equal to the resulting video aspect ratio and less than a higher threshold, the motion is one of:
      i) a panning motion with the start rectangle as a sub-rectangle positioned in a center of one of: a first column of the sub-rectangle grid, or a last column of the sub-rectangle grid, and the end rectangle as a sub-rectangle positioned in a center of one of: a first column of the sub-rectangle grid, or a last column of the sub-rectangle grid; and
      ii) a zoom and pan motion with the start rectangle as one of: the reference rectangle, or a sub-rectangle in a center row of the sub-rectangle grid, and the end rectangle as one of: the reference rectangle, or a sub-rectangle in a center row of the sub-rectangle grid; and e) If the aspect ratio of the image is greater than the higher threshold, the motion applied is a horizontal panning motion with no zoom with the start rectangle being substantially similar in size as the end rectangle.

9. The system of claim 4, the overall motion duration is calculated by taking into account the motion duration for pan ($T_p$), motion duration for zoom ($T_z$) and a predefined minimum threshold for motion duration ($T_{min}$).

10. A system that facilitates creating an image-based video, comprising:
a component that receives a resulting video aspect ratio and an image; and
a motion component that automatically generates and applies a motion to the image based at least in part upon a comparison of an aspect ratio of the image and the resulting video aspect ratio, the motion component providing a default setting, wherein motion is not generated and applied to an image with a caption.

11. A computer implemented method that facilitates creating an image-based video, comprising:
receiving an image;
receiving a resulting video resolution that the image-based video is to be displayed in;
analyzing the image and the resulting video resolution;
determining a motion for the image based at least in part upon a comparison of an aspect ratio of the image and an aspect ratio of the resulting video;
applying the motion to the image;
creating a reference rectangle used to center the image;
dividing the reference angle into an equal amount of columns and rows to create a sub-rectangle grid;
determining a numeric difference based upon the comparison; and
utilizing a start rectangle as a first frame of motion and an end rectangle as a last frame of motion, wherein each position of the start rectangle and the end rectangle are related to the numeric difference and an associated category.

12. The method of claim 11, further comprising at least one of the following: 1) adding an in-between motion for a second image adjacent to the first based at least in part upon the motion applied to a first image, and 2) determining a duration of the motion based at least upon the motion applied and a preferred motion speed.

13. The method of claim 11, further comprising adding a transition for a duration between a first image and a second image, the first image and the second image are subsequent images, the transition is one of a wipe, a fade, a cross-fade, an explode, an implode, a matrix wipe, a push, a dissolve, a checker, and any suitable transition utilized in video post-production.

14. The method of claim 11, further comprising accumulating the image to be presented as the image-based video.

15. The method of claim 13, further comprising cropping the image to an aspect ratio that is substantially similar to the resulting video aspect ratio.

* * * * *